Sept. 4, 1956 J. B. BEECROFT 2,761,285
CONTROL SYSTEM FOR POWER-OPERATED MOVING MEMBERS
Filed Sept. 3, 1953 8 Sheets-Sheet 1

INVENTOR
JULIAN B. BEECROFT
By Douglas S. Johnson
ATTY.

Fig. 2.

INVENTOR
JULIAN B. BEECROFT

Sept. 4, 1956 J. B. BEECROFT 2,761,285
CONTROL SYSTEM FOR POWER-OPERATED MOVING MEMBERS
Filed Sept. 3, 1953 8 Sheets-Sheet 8

INVENTOR
JULIAN B. BEECROFT
ATTY.

United States Patent Office 2,761,285
Patented Sept. 4, 1956

2,761,285

CONTROL SYSTEM FOR POWER-OPERATED MOVING MEMBERS

Julian B. Beecroft, Whitby, Ontario, Canada

Application September 3, 1953, Serial No. 378,232

13 Claims. (Cl. 60—97)

This invention relates to means for maintaining moving members, at least one of which is power operated, in desired correlated positions throughout their range of movement.

The invention particularly relates to the controlling of a hydraulically operated member to follow a predetermined movement related to the movement of another or controlling member.

In many hydraulically operated systems employing two or more hydraulic units, each including a cylinder and operating piston, it is frequently desired that the pistons or cylinders move in synchronism e. g. to maintain a hydraulic lift level. Again it may be desired to correlate the piston movements so that one moves at a predetermined different rate from the other as for instance in hydraulic dumping equipment. Alternatively, it may be desired to move the piston of a single hydraulic unit a predetermined accurately defined distance upon predetermined movement of a control member.

Hydraulic synchronizing systems have previously been proposed for specific applications but none of these have been flexible enough for any broad commercial application. Moreover, such previous systems have required complicated gearing and other expensive mechanical arrangements.

It is the object of this invention to provide a flexible control arrangement for power operated, particularly hydraulically operated, moving members, which arrangement will enable a pair of such power operated members to move in exact synchronism, or to move at different but accurately predetermined and correlated rates, or which will enable a power operated slave member to accurately follow the movements of a control member.

Another object of the invention is to provide a control arrangement as aforesaid which will be simple and economical for both installation and maintenance.

Still another important object is to provide a control arrangement which will enable any number of power or hydraulically operated members or devices to be synchronized or moved in predetermined varying relation.

According to the present invention the power operated member or device whose movement is to be correlated to the movement of another member or device is operated by a control, and this control in turn is actuated by a controlling device having a neutral position allowing the control to remain in its initial position. The controlling device in turn is operated by a device or system having in effect an extensible and retractible action and extending between the controlling device and the moving members which are to be correlated. When the movement of the latter varies from desired correlation, the controlling device is moved by such extensible and retractible device or system from its neutral position in a manner to restore the moving members to desired correlated positions.

As a particular application, the power operated member or device comprises a hydraulically operated member controlled by a valve and the controlling device is connected to operate the valve.

The extensible and retractible device or system may comprise a hydraulic liquid operating in a hydraulic circuit including reservoir means for supplying and receiving the liquid as the liquid column between the controlling device and moving members varies under movement thereof as disclosed in my co-pending United States application Serial No. 378,393 filed September 3, 1953.

Alternatively and as herein particularly described the controlling device comprises a drum mounted for bodily movement as well as rotary movement, and the extensible and retractible device comprises a flexible element or cable connected between each of the moving members and wound on the drum, the drum having means associated with it, viz. a spring or counterweight, acting to wind on the cables.

More particularly, according to this form of the invention, the drum has a neutral position in which the control or valve is held in an initial or preset position, and the cables are wound over the drum from opposite directions, and the length of the cables are regulated whereby with the moving members in correlated position the tensions in the cables under winding tension of the drum, with the drum in the neutral position, will exactly balance to provide an equal and opposite pull on the drum, balancing the drum in its neutral position. However, when the cables are wound on or off the drum at different rates caused by the members moving out of correlated position, the cable tensions tend to vary and the drum accommodates this tendency by displacing from its neutral position in a direction to operate the control or valve to again restore the members to correlated positions.

By controlling the shape or diameter of the drum the members can be made to move at different predetermined rates as desired, and where desired the movement of the power or hydraulically operated member may be made a multiple of the movement of the other moving member.

By pairing two hydraulically operated devices in one circuit and providing a valve controlling device therefor and associated extensible device to obtain correlated movement thereof these paired devices may be correlated or synchronized with a single or pair of devices in another circuit by providing a second valve controlling hydrualic flow to the two circuits, a second controlling device for the latter valve, and a second extensible and retractible device connected between the second controlling device and one of the hydraulically operated devices in each circuit.

In this way any number of hydraulically operated devices may be correlated or synchronized.

A fuller understanding of the invention will be had from the following detailed description taken in conjunction with the accompanying drawings in which:

Figure 8 is an enlarged detail of the valve of the hydraulic system of Figure 9.

Figure 9 is a side elevational view showing the application of the invention to synchronize three cylinders, the valves of the hydraulic circuit being shown partly in diagrammatic and partly in sectional form.

Figure 10 is a plan view of the set up of Figure 9.

Figures 11 and 12 are plan views on a reduced scale illustrating an alternative arrangement of the three cylinders for operating a platform lift or the like.

Figure 1:
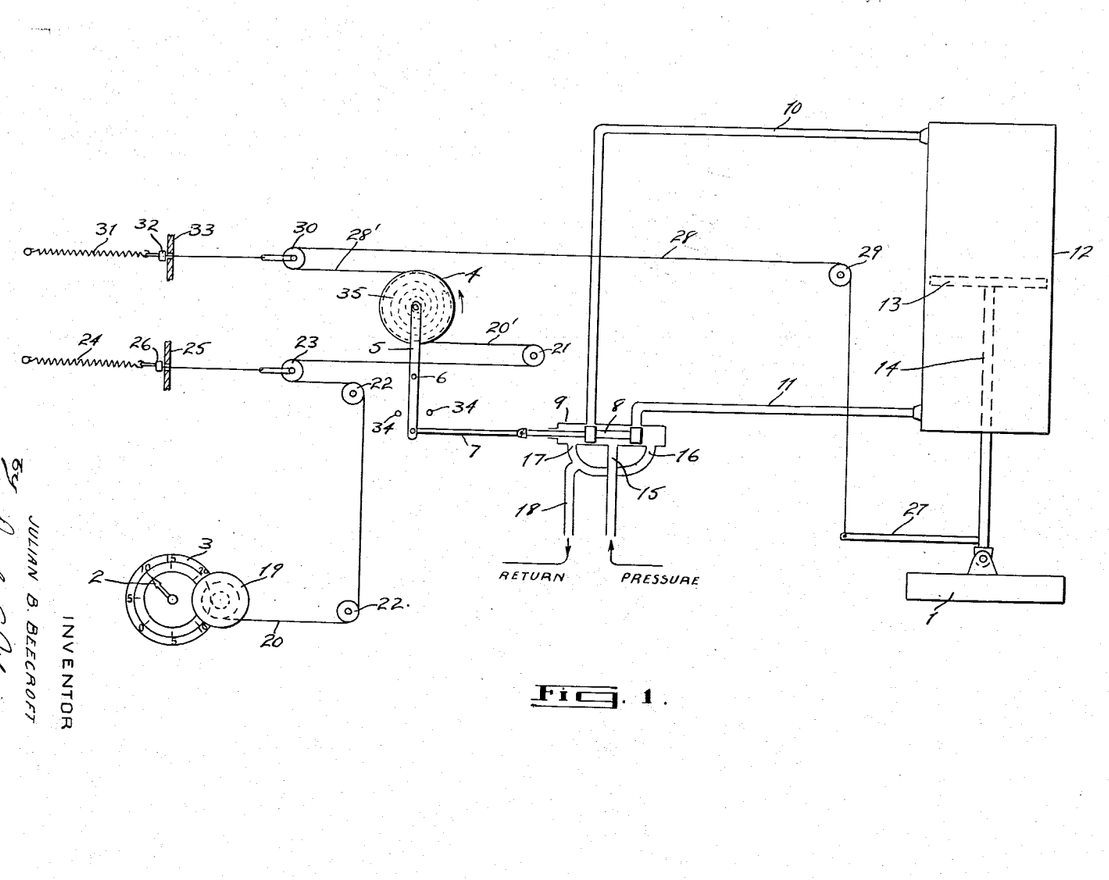
Figure 1 is a schematic diagram illustrating one application of the invention in which a hydraulically operated platen is actuated to follow the movement of a remote control, the platen and remote control being in stationary correlated positions.
Figure 2:
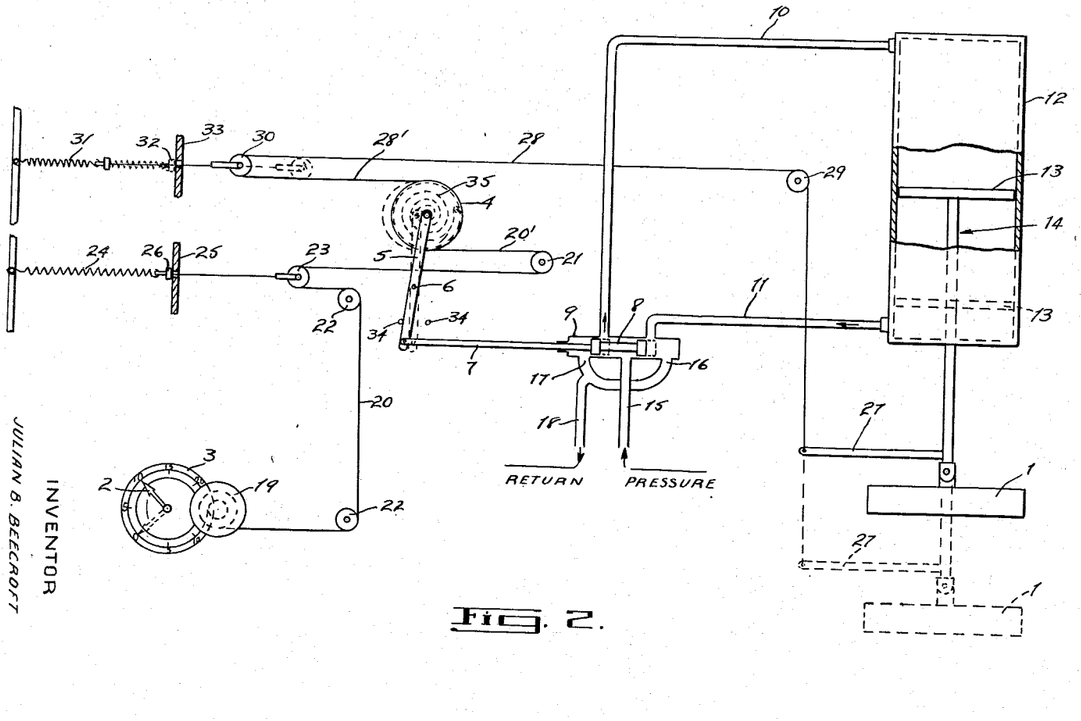
Figure 2 is a view similar to Figure 1, but showing the remote control moved to a new dotted line position and the control system actuated to effect corresponding movement of the platen.
Figures 3, 4, 5:
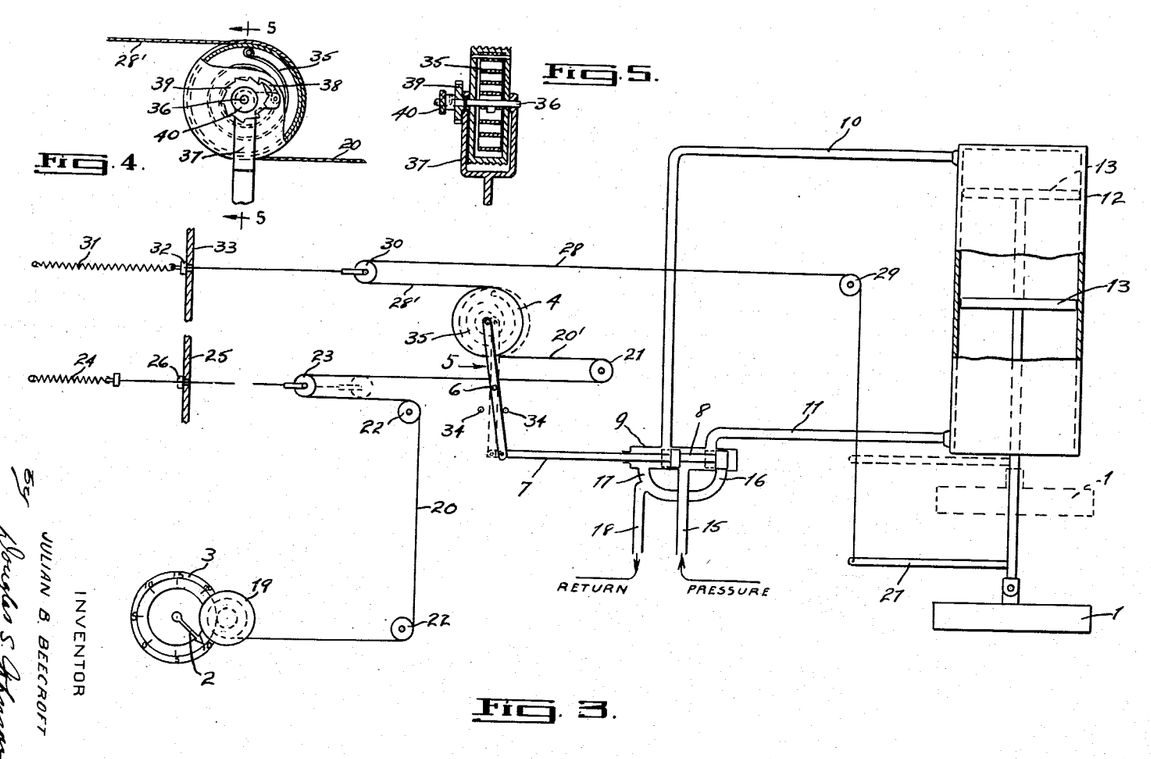
Figure 3 is a view similar to Figure 2 but showing the remote control move to alternate position.
Figure 4 is an enlarged part elevational part sectional view of the controlling drum mechanism.
Figure 5 is vertical section on the line 5—5 of Figure 4.

Referring to Figures 1 to 3, a simple application of the invention is illustrated in which a platen or ram 1, for instance of a hydraulic press, is actuated to move a precise distance corresponding to the setting of a control member 2 in the form of an indicator arm having an associated dial 3. To provide this control, a drum 4 is rotatably mounted on the end of a lever arm 5 pivoted at 6 intermediate its length. The drum is thus mounted for rotary movement about its own axis and bodily or translatory movement about the axis 6.

Connected to the end of the lever 5 remote from the drum is a bar 7 which in turn is pivoted to a sliding valve member 8 of a five-way valve 9 connected in a hydraulic circuit including hydraulic lines 10 and 11 leading to opposite ends of a hydraulic cylinder 12 in which a piston 13 connected by a piston rod 14 which the platen 1 operates. The valve 9 has a central pressure inlet 15 opposite to and between the hydraulic lines 10 and 11 and a pair of outlets 16 and 17 adjacent the ends leading to the return line 18.

Associated with the control member 2 is a gear-operated drum device 19. Leading from the drum device 19 to drum 4 is a cable 20 passing around fixed pulley 21 adjacent the drum and a pair of fixed pulleys 22. Between the adjacent pulleys 21 and 22 the cable leads around a displaceable pulley 23 connected to a spring 24 urging pulley 23 to the left and a stop surface 25 is provided for engaging stop 26 to limit movement of pulley 23 to the right.

Leading between arm 27 connected to the piston rod 14 and the drum 4 is a second cable or flexible element 28 passing over a fixed pulley 29 and around a displaceable pulley 30 urged to the left by a spring 31 and limited in its movement to the right by stops 32 and 33.

The above arrangement provides a movement of the platen or ram 1 corresponding to the movement of the control member 2 as multiplied by the gear operated drum device 19 associated therewith as follows:

With reference to Figure 2, when the control or hand 2 is moved anti-clockwise to reel the cable 20 on the drum 19 the shortened length of cable between the drum 19 and the drum 4 acts to pull the drum 4 to the right until the lever arm 5 strikes a stop 34. When the drum 4 has thus reached the limit of its bodily displacement to the right, the excess of cable required by the movement of the control 2 winding it on the drum 19 is obtained by unwinding a portion of cable 20 from the drum 4 against the action of the spring 35 which is urging the drum to rotate in a direction to wind on both cables 20 and 28, these cables both having a plurality of turns wound about the drum.

Since the excess cable 20 required to accommodate the movement of the control member 2 is obtained by unwinding of the drum 4, this unwinding action runs off a portion of the cable 28 and the slack of this latter cable is taken up by the spring 31 pulling the pulley 30 to the left, the tension of the spring 31 being less than the spring 35 as is also the spring 24, so that the springs 31 and 24 will not interfere with the winding up action produced by this spring 35.

With the lever arm 5 swung against the left hand stop 34, the sliding valve member 8 will be operated to the left placing the hydraulic line 10 in communication with the pressure inlet 15 and the hydraulic line 11 in communication with the return line 18 to operate the piston 13 downwardly drawing the cable 28 over the pulley 29 and downwardly and drawing the pulley 30 to the right against the action of the spring 31. When the piston has moved sufficiently to bring the stops 32, 33 into engagement, then continued movement of the piston acts to pull the drum 4 to the left, which action is permitted by unwinding of the cable 20 from the drum 4 against the action of the spring 35 until the drum has swung to bring the lever arm 5 to its dotted line position of Figure 2 moving the sliding valve member 8 to the right to cut off hydraulic flow in the lines 10 and 11 bringing the piston 13 to a halt with the plate 1 having descended the precise distance dialed by the control arm 2.

To elevate the platen 1 the movement of the control member 2 is reversed being swung in a clockwise direction to the position indicated in Figure 3.

As shown in Figure 3, the cable 20 is reeled out from the drum 19. Since the spring 24 is weaker than the spring 35, the drum 4 acts to wind in cable 28 and as the cable 28 cannot change length between the drum 4 and the arm 27, until the piston 13 has moved, the drum must wind along the cable 28 causing it to swing bodily to the left, bringing lever 5 against right hand stop 34. Any excess of slack in cable 20 after the drum movement is terminated is taken up by spring 24. This stop action actuates the sliding valve member 8 producing upward movement of the platen 1, the hydraulic circuit flow being reversed from that of Figure 2. Thus it will be seen that when the control member 2 is moved the drum 4 which has been balanced in the central or neutral upright position by equal and opposite pulls of the cable portions 20' and 28' of the cables 20 and 28 respectively, tensioned by the spring 35, the balanced pull by the cable portions 20' and 28' is upset. If the cable portion 20' is pulled to the right, thus increasing the pull in this direction the valve member 8 is moved to the left as shown in Figure 2 and when cable 20 and cable portion 20' are slackened the valve member 8 is moved to the right as shown in Figure 3. When, however, the platen 1 has moved the distance to either take up the slack afforded in the cable 20, 20' or to take up the slack afforded in the cable 28, 28' then the opposite pulls on the drum by the cable portions 20' and 28' are again balanced to hold the drum in its neutral position.

The springs 24 and 31 simply serve the purpose of maintaining the cables 20 and 28 sufficiently tensioned to remain on the various pulleys.

As shown in Figures 4 and 5 the spring 35 comprises a coil spring fixed to a shaft 36, forming the pivot about which the drum 4 rotates, and to the drum.

The lever arm 5 has a yoke 37 supporting the shaft 36 and fixed to this yoke is a pawl 38 engaging a ratchet 39 fixed to the shaft 36. The tension of the spring 35 may be adjusted by rotating the shaft 36 through a control knob 40 and locking the shaft by the pawl 38.

The above system described in connection with Figures 1 to 3 may be considered as a master and slave system in which the platen 1, piston 13, form the slave members to accurately reproduce the movement of the master member constituted by the control 2 and the motion multiplying device 19.

Figure 6:
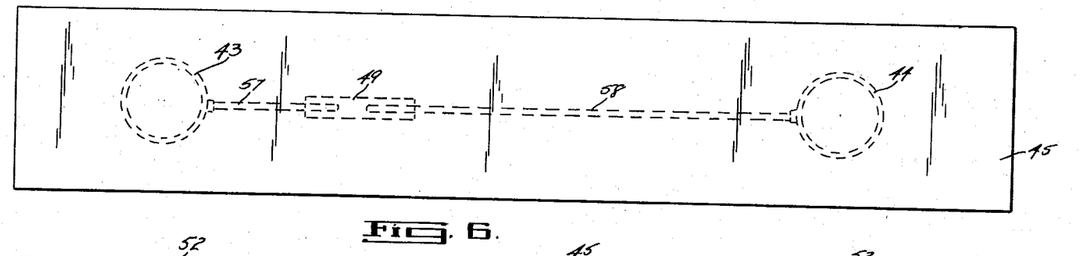
Figure 6 is a plan view of a platform to be operated by a pair of hydraulic cylinders synchronized in accordance with the invention.
Figure 7:
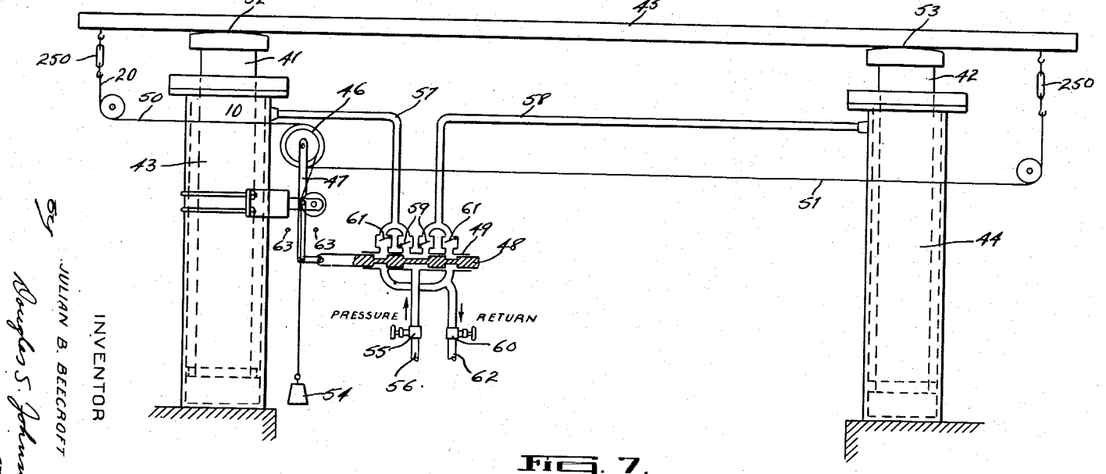
Figure 7 is a side elevational view of the set up of Figure 6 with the hydraulic circuits shown in diagrammatic form.

Figures 6 and 7 illustrate the application of the invention to maintain two hydraulically operated members constituted by the pistons 41 and 42 operating in the cylinders 43 and 44 respectively in synchronism to maintain a platform 45 horizontal under all conditions of loading.

As is well known, differences in frictional and other loads will cause the pistons of two cylinders connected in the same hydraulic circuit for an equal proportion of the hydraulic flow to move at different rates. With the control system as disclosed in Figure 7, however, the travel of the pistons 41 and 42 is synchronized regardless of the disposition of the load on the platform 45. As before a drum 46 is rotatably mounted for translatory or bodily movement on a lever 47 which in turn is connected to operate a slide valve member 48 of a valve 49. The cables 50 and 51 attached to the platform 45 adjacent to the points of support 52 and 53 afforded by the pistons 41 and 42 are wound about the drum 46 from opposite sides under the torque afforded by the counterweight 54.

The effective length of the cables 50 and 51 is adjusted so that with the platform 45 horizontal the opposing pull of the cables 50 and 51 as tensioned by the counterweight 54 will exactly balance with the lever 47 in a vertical, central or neutral position and with the slide valve member 48 in the position illustrated in Figure 7.

In this position when manual valve 55 in the pressure line 56 is opened hydraulic flow will divide equally through the hydraulic branches 57 and 58 after passing through the valve 49 and check valves 59.

As the pistons 42 and 41 move together the cables 50 and 51 will be drawn off the drum 46 in opposite directions at the same rate maintaining the balanced pull on the drum, with the drum in its neutral position. Upon either piston 41 or 42 getting out of step, tilting the platform 45, the one cable will be drawn off faster than the other, thus causing the drum to move from its original, or neutral balanced position to maintain the opposing pull of the cables equal and opposite, causing the drum 46 to be displaced in the direction in which the cable is being withdrawn faster, thus actuating the slide valve member 48 in a direction to reduce or cut off flow to the faster moving piston until the platform has come again into the horizontal position at which time the pull by the cables 50 and 51 will again be balanced with the drum 46 returned to its central or neutral position.

Similarly to effect downward platform movement with the manual valve 55 shut-off, the manual valve 60 in the return circuit is opened allowing flow through the check valve 61, valve 49 and return 62. Again the balance conditions in the control system will be upset upon relative movement of the pistons 41 and 42 tilting the platform 45 and the drum 46 will move its cable tension balancing position in a direction to restore the pistons to synchronization.

As shown in Figure 7, suitable stops 63 may be employed to limit movement of the lever 47 under conditions of unbalanced length of cables 50 and 51 providing an unbalance in the opposing pull on the drum 46.

Figures 8, 9, 10, 11, 12:
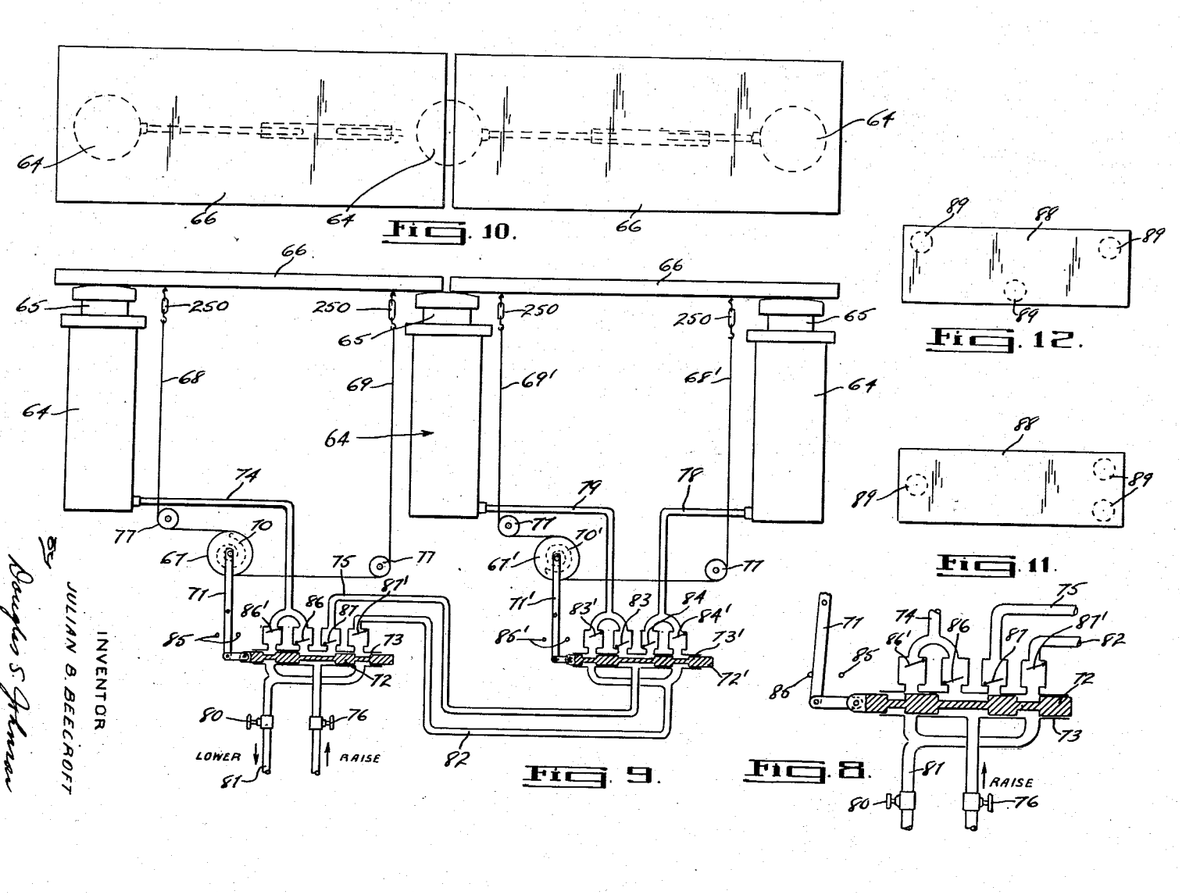

Figures 9 and 10 show the hydraulic cylinder control set up to control three cylinders and maintain them in correlated relation throughout the range of travel of their pistons. The cylinders 64 are shown with their pistons 65 supporting two independent loads 66. Controlling the movement of the piston in the left hand cylinder 64 and the piston in the central cylinder, is a drum device 67, associated cables 68, 69, a suitable spring 70 for winding in and maintaining tension on the cables which are led to the drum from opposite sides, and the supporting lever 71 supporting the drum 67 for bodily movement as well as drum rotation. Operated by the lever 71 is a slide valve member 72 controlling hydraulic flow through the valve 73 which is similar to the valve 49, Figure 7.

With the centre and left-hand pistons correlated, the slid valve member 72 is in the position of Figure 9 with drum 67 in a central or neutral position. The valve 73 is proportioned with drum 67 in the neutral position to direct hydraulic flow in the lines 74 and 75 in a ratio of one to two for equal capacity cylinders 64. Thus with manual valve 76 open to raise the cylinders the flow is split by the valve 73 to proportion the flow to the left-hand cylinder and to the central and right-hand cylinders connected in parallel to enable equal piston movement to be achieved. Dividing the flow between the central cylinder and the right-hand cylinder is a second valve 73' controlled by a slide valve member 72' which is operated by a supporting lever 71' on which is rotatably mounted for bodily movement a drum 67' having associated therewith cables 68' and 69'. As in the case of the cable 68 and 69, these cables are led over idler pulleys 77 and onto the drum from opposite sides thereof, spring 70' acting to wind in the cables and hold them taut.

With the central and right-hand piston 65 correlated, the drum 67' is in the central or neutral position shown in Figure 9 and the valve 73' is proportioned and the slide valve member 72' is located to provide equal flow between the branch lines 78 and 79. Thus for raising the load 66 which constitutes the platforms and maintaining these platforms horizontal, the valve 73 divides the flow between the lines 74 and 75 in the ratio of one to two and the valve 73' divides the flow between the lines 78 and 79 equally so that each cylinder is receiving the same liquid volume. When it is desired to lower the loads or platforms 66, manual valve 80 is operated to open the discharge line 81 and valve 76 is closed. Then again valve 73 divides the returning flow from the line 74 and the line 82 leads off from valve 73' in the proportion of one to two and the valve 73' divides the return flow from the lines 78 and 79 equally to maintain the instep relationship of the descending pistons 65.

In the event that one cylinder, say the right-hand cylinder has its piston move out of step with the remaining pistons because of some anomaly of the load, for instance, if the pistons are being raised, the right-hand piston is dragging and the right-hand load or platform 66 will tilt being higher at the centre cylinder. This action will upset the neutral balance point of drum 67' and the drum will wind to the left along the cable 69' swinging the lever 71' in a counterclockwise direction against stop 85' to operate the valve 73' to reduce flow through the check valve 83 while allowing uninterrupted flow through the check valve 84. Thus the unbalancing of the drum 67' operates in a manner to decrease flow through line 79 to the central cylinder until the cylinder is again moved into step and the cable 68' and 69' again exert an equal and opposite pull on the drum with the drum moved to the central or neutral position of Figure 9, equalizing the flow in the lines 78, 79.

If the cutting down of flow to the central cylinder brings the pistons of the central cylinder and the left-hand cylinder out of correlated position, that is with the central piston dragging below the left-hand piston, there will be an unbalance in the system of the cable 68 and 69 causing the drum 67 to move bodily to the left operating lever 71 anti-clockwise as limited by stop 85 to slide valve member 72 to the right. This action reduces flow through check valve 86 to line 74 while leaving the flow through check valve 87 to line 75 unaffected, cutting down on the advance of the left hand piston. As the central and left hand pistons move into step, the drum 67 will move back again to its central position. Proportionate flow will then be reestablished through the lines 74 and 75 to maintain the cylinders and their pistons in synchronized operation.

Figures 9 and 10 show the cylinders 64 arranged in a line, Figures 11 and 12 show other arrangements which may be desired for different conditions of loading in which the load or platform 88 is operated by three cylinders 89.

The synchronization or balancing has been described with reference to the pistons 65 raising and it will be appreciated that exactly the reverse action will be provided when the cylinders are lowering through operation of the valve 80 and in this case the flow through the check valves 83', 84', 86' and 87' will be regulated to maintain the platforms in horizontal position. As in connection with the two cylinder arrangement of Figures 6 and 7 suitable adjustable hangers 250 are provided to connect the cables to the moving load or element so that the cable lengths can be accurately adjusted to provide the equal and opposite pull on the controlling drum devices with the drums in the neutral or central positions and the cylinders in correct correlated relation.

Figure 13:
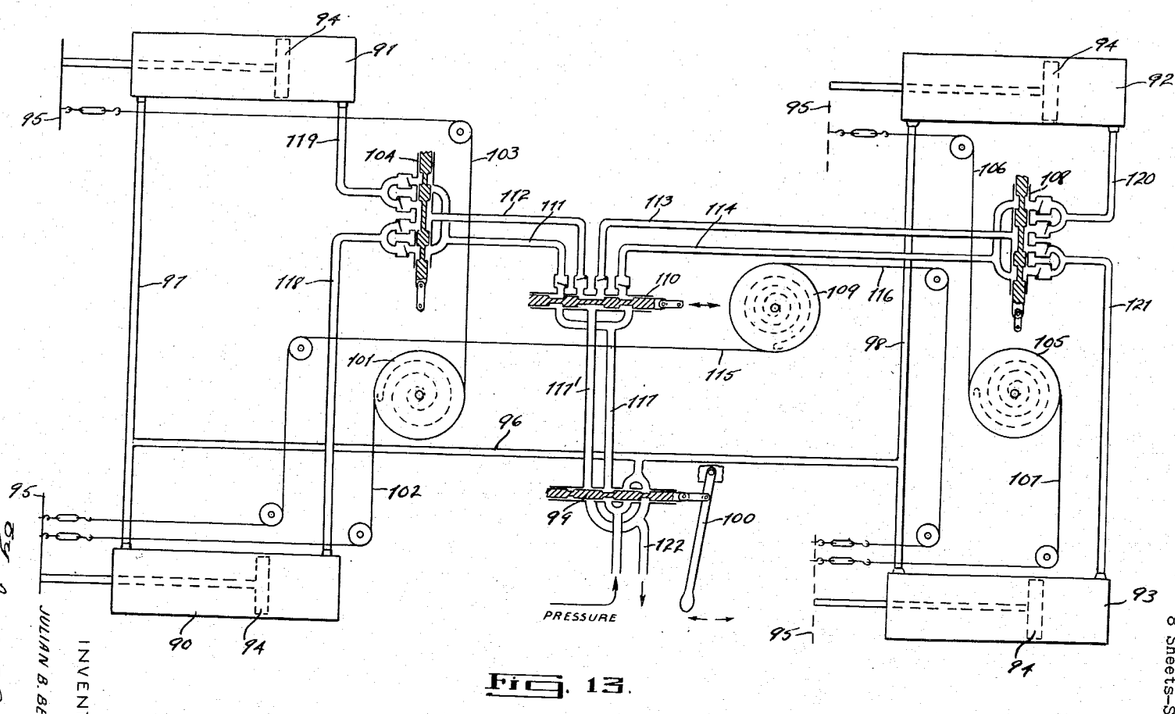
Figure 13 is a diagrammatic view showing the application of the invention to synchronize the movements of the pistons of four double acting hydraulic cylinders.

Figure 13 shows the cylinder control system applied to maintain four double-acting cylinders in synchronized relation. Each of these cylinders 90, 91, 92 and 93 has a piston 94 operating therein actuating a load 95 which may be a single load supported at four different points, but normally it will be four separate loads for an arrangement in which the movements of the loads are to be correlated. The cylinders 90 and 91 are connected in a pair as are cylinders 92 and 93 and a hydraulic line 96 is coupled to the lines 97 and 98 communicating with one end of the paired cylinders 90 and 91 and 92 and 93 respectively. A slide valve 99 operated by lever 100 controls pressure flow to and exhaust from the hydraulic circuit of the cylinders. Balancing the paired cylinders 90 and 91 is a drum device 101 and associated cables 102 and 103. The drum device in turn controls valve 104 to divide the flow between the cylinders 90 and 91 as disclosed in connection with Figure 7. Similarly drum device 105, associated cables 106 and 107, controls the dividing valve 108 regulating flow to the paired cylinders 92 and 93 to maintain them in synchronization.

A third drum device 109 actuates a third valve 110 which in turn divides the flow through the lines 111, 112, 113 and 114 to and from the valves 104 and 108. The drum device 109 has associated therewith the cables 115 and 116 which in turn are connected to the balanced loads of the paired cylinders 90, 91 and 92, 93 respectively.

With slide valve 99 in the position illustrated in Figure 13, the pressure flow through line 117 is first divided between lines 111 and 114 with the cylinders 90 to 93 in correlated or synchronized position.

The flow in line 111 is then divided between the lines 118 and 119 by valve 104, providing equal flow to the cylinders 90 and 91. Similarly the flow in line 114 is divided by valve 108 between the lines 120 and 121 to provide equal flow to the cylinders 92 and 93.

The exhaust from the opposite ends of the cylinders are connected through lines 97 and 98 and 96 and valve 99 to the exhaust line 122. The various valves and associated mechanism will control the flow division to maintain the cylinders in the synchronized relation. To provide the reverse movement of the pistons 94, valve 99 is actuated to the right to connect the pressure line to the hydraulic lines 96, 97 and 98 and to connect the cylinder lines 118, 119, 120, 121 through the valves 104, 108 and 110 and return line 117' and valve 99 to the exhaust line 122.

Figure 14:
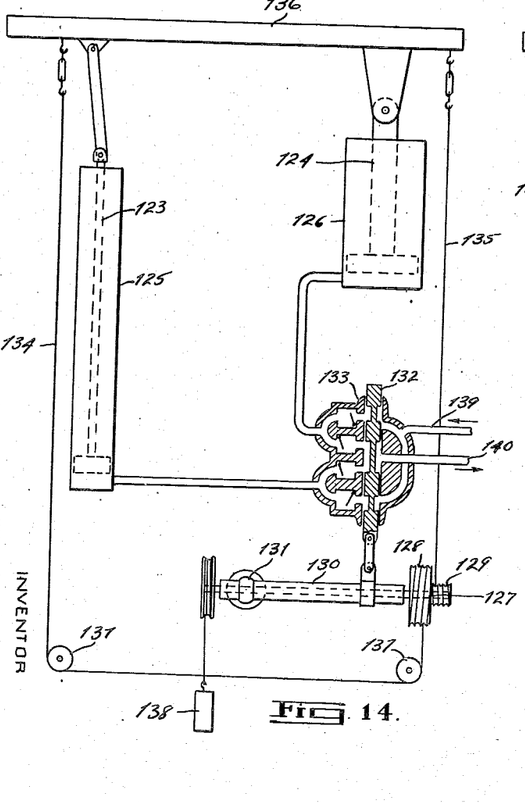
Figure 14 shows another alternate application of the invention to correlate the movements of pistons of different size hydraulic cylinders.

Figure 14 shows the cylinder control system applied to regulate the operation of two cylinders of different diameters, and the pistons of which are to be given different rates of movement. In this case the drum device controlling the operation of the pistons 123 and 124 in cylinders 125 and 126 respectively and generally designated at 127 has different diameter sections 128 and 129. The drum is mounted on a lever arm 130 swingably supported by a pivotal holder 131 to swing about an axis perpendicular its axis of rotation. Lever arm 131 is coupled to the slide member 132 of a valve 133 dividing flow between the cylinders 125 and 126. Cables 134 and 135 are connected to the platform or load 136 and lead over idlers 137 to the drum sections 128 and 129 respectively. A counter-weight 138 acts to rotate the drum device to wind the cables 134 and 135 on their respective drum sections 128 and 129 and with the pistons 123 and 124 in a desired correlated position the lengths of the cables 134 and 135 are adjusted so that the opposing pull exerted thereby on the drum device hold the drum in a neutral position as shown in Figure 14.

As the hydraulic liquid under pressure is delivered through the inlet 139, the flow will be divided equally between the cylinders 125 and 126 causing the piston 123 to move at a faster rate than the piston 124 to cause a tilting of the platform 136 which may for instance represent a piece of dumping equipment.

Since the cables 134 and 135 are being pulled off different diameter drum portions, the platform can continue to tilt on maintaining the pull of the cables 134 and 135 in opposite directions on the drum device equal, with the drum in the neutral or central position.

However, should the pistons 123 and 124 get out of step so that the rate of their difference of movement varies from the rate of cable being drawn off the drum device, the slide device 132 will be operated by the drum device to regulate the division of hydraulic flow in a direction to restore the pistons to their predetermined correlated movement.

By introducing flow through the line 139 the elevation of the pistons is achieved and by cutting off flow through 139 and draining through line 140 the descent of the pistons is obtained and is controlled to effect the descent of the platform 136 in a predetermined path.

Figure 15:
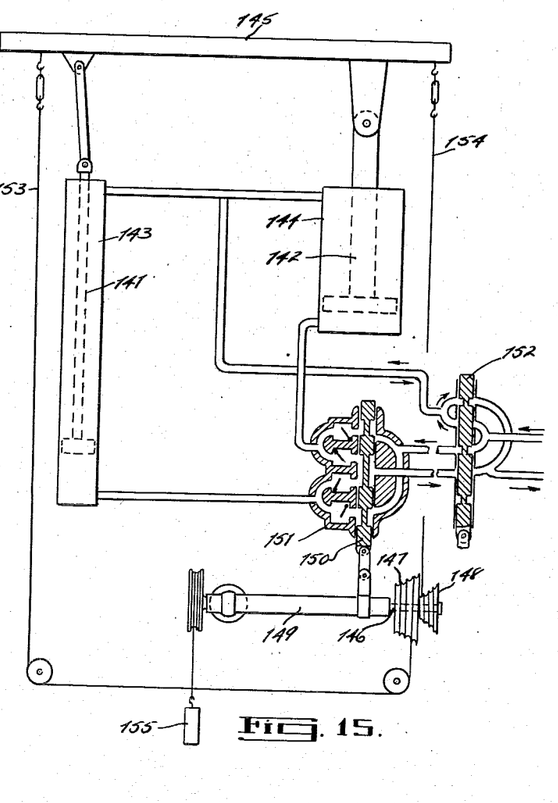
Figure 15 is an elevational view showing a further modified system with which the invention is employed to provide variable rates of movements of the moving hydraulic members.

Figure 15 illustrates the application of the invention to control the movement of pistons 141 and 142 in two double acting cylinders 143 and 144 of different diameters. In this instance, it is desired that the load 145 be tilted at different rates corresponding to its position and to this end the drum device illustrated generally at 146 is provided with sections 147 and 148 of different and varying diameters. As before the drum is mounted on a lever arm 149 which supports the drum for bodily as well as rotary movement and the lever arm in turn operates slide 150 of valve 151. A valve 152 regulates pressure flow to and from the cylinders with the valve 151 controlling the division of flow to the cylinders for one setting of valve 152 and controlling the division of exhaust from the cylinders for the other setting of valve 152.

Cables 153 and 154 are connected to the platform 145 adjacent the pistons 141 and 142 respectively. As illustrated the platform or load 145 is horizontal in one position at which point the cables 153 and 154 are adjusted so that under the tension imparted by the counter-weight 155 acting to wind on the cables, the opposing pulls of the cables exactly balance with the drum device, in a central or neutral position. The drum device will remain in its central or neutral position as long as the cables 153 and 154 are drawn off or wound on at their predetermined relative rates corresponding to the design of the drum sections 147 and 148. Any variation in the cable movement from the predetermined relative rates will effect bodily movement of the drum device to operate the valve 151 in a direction to restore the pistons 141 and 142 to their correlated positions.

The previous examples have shown the drum devices revolvably supported to revolve about an external pivot to provide the bodily or translatory movement.

Figure 16:
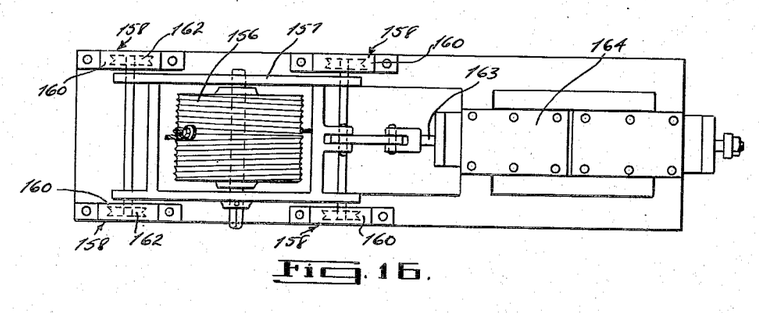
Figure 16 is an enlarged plan view showing a modified form of drum mechanism for operating the hydraulic control valve.
Figures 17, 18:
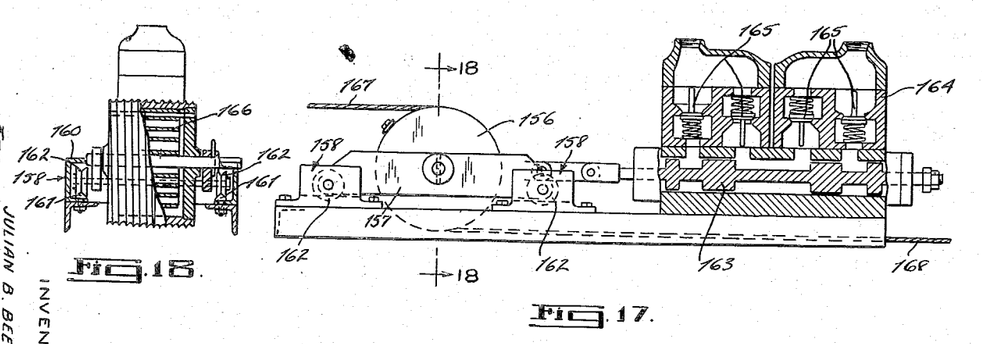
Figure 17 is a part side elevational, part vertical sectional view of the device of Figure 16.
Figure 18 is a vertical section on the line 18—18 of Figure 17.
Figure 19:
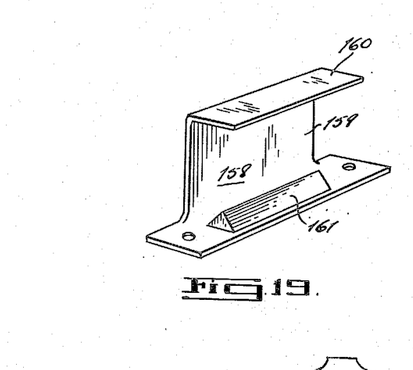
Figure 19 is a perspective of one of the guide tracks controlling movement of the drum device.

Figures 16, 17 and 18 illustrate a drum 156 rotatably mounted on a carriage 157 guided by tracks 158 in the form of flange members 159 having upper retaining flanges 160 and ridges 161 engaging wheels 162 of the carriage. Slidably mounted for movement in the same direction as the carriage 157 is a slide member 163 of a valve 164 including the spring loaded auxiliary check valves 165.

A suitable spring mechanism 166 is provided to wind the opposingly directed cables 167 and 168 on the drum and the lengths of the cables are adjusted to impart an equal and opposite pull on the carriage in the direction of carriage movement with the slide 163 in the full line position of Figure 17.

For simplicity of description and ease of understanding it has been assumed in the above illustrations that the flow through the various valve ports has been equal or in the desired proportion with the neutral position of the drum device in the central position illustrated.

However, in actual operation it will be understood that under certain condition of loading the neutral position of the drum device may vary from the central position providing a difference in valve port area to maintain the equal or desired proportionate flow between the branch circuits connected with the valve. That is, the neutral position of the drum device is that position at which the flow in the branch circuits is correctly proportioned with respect to cylinder requirements.

Where the volume requirements of cylinders vary the port areas of the valves and conditions will of course correspondingly vary.

Also, the accuracy of synchronizing may of course be controlled by design of port areas and by regulating the extent of movement of the valve or control member for a given movement of the members being correlated as will be readily understood.

The cables 167 and 168 are connected to the moving element or elements to be synchronized or controlled and variations of the motion of these elements out of synchronization will effect an unbalance in the opposing pull of the cables to operate the carriage 157 from the intermediate position of Figure 17 to actuate the valve 164 in a manner to restore the moving elements to synchronism.

While in the foregoing illustrations the cylinders have been shown as stationary and the pistons as the moving elements it will be understood that for many applications the pistons may be fixed and the cylinders caused to move by the introduction of a fluid under pressure to one or other end of the cylinder.

It will be understood that my system of control in which I employ an extensible and contractible arrangement governing the operation of a control may be employed in many other applications than herein depicted, or combinations of various applications herein depicted, and it will be understood that such variations as well as equivalent mechanisms may be employed without departing from the scope of the appended claims.

What I claim as my invention is:

1. In a power system, at least two movable members whose movement is to be correlated to constitute master and slave members, a rotary member mounted for bodily movement, a flexible element connected to the master member and to said rotary member to wind thereon from one direction, a flexible element connected to the slave member and said rotary member to wind thereon from the opposite direction, means continuously imparting a torque on said rotary member to wind on said flexible elements from opposite directions, a source of power for moving at least one of said master and slave members, and a control for said power source actuated by bodily movement of said rotary member.

2. In a power system, a source of power, a movable master member and a movable slave member with at least the latter being operated by said power source, a drum mounted for rotary and bodily movement, a control for said power source actuated by the bodily movement of said drum, a flexible element connected between each of said master and slave members and said drum and leading on to said drum from generally opposite directions, and means applying a torque to said drum in a direction acting to wind said flexible elements on said drum.

3. In a power system, a source of power, at least one movable member to be actuated by said power source, at least another member whose movement is to be correlated to the aforesaid member, a rotary drum member mounted for translatory movement, a control for said power source actuated by translatory movement of rotary drum member, flexible elements connected directly between and fastened to each of said members whose movement is to be correlated and said rotary drum member said flexible elements leading on to said drum from opposite directions, and means applying a torque to said drum member in a direction acting to rotate said rotary drum member to wind said flexible elements thereon.

4. In a hydraulic system, a movable member, an hydraulically operated member whose movements are to be tied to the movements of said movable member, a valve controlling said hydraulically operated member, a drum mounted for rotary and translatory movement, means translating translatory movement of said drum into movement of said valve, flexible elements connected to each of said members and to said drum and wound about said drum from opposite directions, and means applying torque to said drum in a direction acting to wind said flexible elements on said drum.

5. In a hydraulic system, a movable member, an hydraulically operated member whose movements are to be correlated to the movements of said movable member, a valve controlling movement of said hydraulically operated member, a drum device mounted for rotary and translatory movement connected to said valve and having a nuetral position, flexible elements connected to said members and to said drum device and wound about said drum device, means acting to wind said flexible elements on said drum device, said flexible elements leading off from said drum in opposing directions and having a relative length so as to maintain said drum in said neutral position with said members in desired correlated positions and actuating said drum from said neutral position upon relative displacement of said members from correlated positions to actuate said valve to restore said members to correlated positions.

6. A device as claimed in claim 5 in which said drum device is pivotally supported on a lever arm and said lever arm is connected to said valve.

7. A device as claimed in claim 5 in which said drum device is rotatably mounted on a carriage and said carriage is connected to said valve.

8. A device as claimed in claim 5 in which said drum device has portions of different sizes and the flexible elements connected to said movable member and hydraulically operated member are wound on different size portions.

9. A device as claimed in claim 8 in which at least one of said different size portions has a varying size.

10. Means for maintaining hydraulically operated members in predetermined synchronized relation comprising in combination with the hydraulic circuit including said members and valve means for controlling said hydraulic circuit, a drum device mounted for rotary and translatory movement, means imparting translatory movement of said drum to said valve means, said drum device having a neutral position wherein the setting of said valve means is adapted to operate said members in predetermined synchronized relation, flexible elements connected to said hydraulically operated members and wound on said drum from opposite directions and fastened to said drum, and biasing means acting to rotate said drum in a direction to wind on said flexible elements, said flexible elements being disposed to pull said drum with equal tension in opposite directions to hold drum device in said neutral position with said hydraulically operated members in desired relative positions and to displace said drum from neutral position upon underside relative movement of said members out of predetermined relation to operate said valve means in a direction to restore said members to predetermined relation, and said drum device being formed to wind said flexible elements on and off at a relative rate according to the desired relative movement of said members.

11. In a hydraulic system, a pair of cylinders, a pair of pistons operating in said cylinders, a hydraulic circuit in which said cylinders are connected to operate said pistons, a valve dividing hydraulic flow between said cylinders, and means controlling said valve to maintain said pistons in predetermined relative positions throughout their travel, said latter means comprising a rotary drum device mounted for translatory movement, means imparting translatory drum movement to said valve to operate same to alter the division of hydraulic flow between said cylinders, said drum device having a neutral position of translation, flexible elements tied at one end to the movements of said pistons and wound over and around said drum from opposite directions and tied at the other end to said drum, and means acting to wind said flexible elements on said drum, said flexible elements being disposed to impart equal and opposite pulls on said drum as said pistons maintain their predetermined relative position to maintain said drum in said neutral position and to displace said drum to operate said valve to alter the division of hydraulic flow to said cylinders upon said pistons moving relatively out of predetermined relative positions.

12. In a system as claimed in claim 11, the combination with said pair of cylinders, pistons, valve and means controlling said valve, of a second pair of cylinders, a second pair of pistons operating in said cylinders, a second hydraulic circuit in which said latter cylinders are connected to operate said latter pistons, a valve dividing hydraulic flow between said second pair of cylinders, and means controlling said latter valve to maintain said second pistons in predetermined relative position, and a third hydraulic circuit feeding the aforesaid hydraulic circuits, a valve imposed in said third hydraulic circuit for dividing hydraulic flow to the first two-mentioned circuits, and means controlling said third valve to maintain said first-mentioned pistons and said second pistons in predetermined relative position.

13. In a hydraulic system, at least two members whose movement is to be correlated, a hydraulic circuit for operating at least one of said members, a valve for said circuit to control movement of the hydraulically operated member, and control means to actuate said valve, said control device comprising a rotary cable storing device having cables connected to each of said two members wound thereon with the cable from one of the members being wound thereon from one direction and the cable from the other member being wound thereon from the opposite direction, said cable storing device being movable in said directions either side of a neutral position to actuate said valve, and means acting to wind said cables on said storing device to continually maintain said cables under tension.

References Cited in the file of this patent

UNITED STATES PATENTS

| | | |
|---|---|---|
| 526,930 | Maxon | Oct. 2, 1894 |
| 604,364 | Brown | May 24, 1898 |
| 722,676 | Clarke | Mar. 17, 1903 |
| 955,852 | Coyle | Apr. 26, 1910 |
| 1,900,050 | Ernst | Mar. 7, 1933 |
| 1,902,356 | Monge | Mar. 21, 1933 |
| 1,962,924 | Bristol | June 12, 1934 |
| 2,359,961 | Anthony | Oct. 10, 1944 |
| 2,376,320 | Butrovich et al. | May 22, 1945 |
| 2,572,902 | Ashton | Oct. 30, 1951 |
| 2,602,298 | Ashton et al. | July 8, 1952 |